United States Patent
Choi et al.

(10) Patent No.: US 8,220,295 B2
(45) Date of Patent: Jul. 17, 2012

(54) DRIVING APPARATUS FOR WASHING MACHINE

(75) Inventors: Soung Bong Choi, Changwon-si (KR); Hung Myong Cho, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 912 days.

(21) Appl. No.: 10/594,714

(22) PCT Filed: Jan. 20, 2006

(86) PCT No.: PCT/KR2006/000241
§ 371 (c)(1),
(2), (4) Date: Nov. 7, 2008

(87) PCT Pub. No.: WO2006/083083
PCT Pub. Date: Aug. 10, 2006

(65) Prior Publication Data
US 2009/0064726 A1 Mar. 12, 2009

(30) Foreign Application Priority Data
Feb. 1, 2005 (KR) ........................ 10-2005-0009062

(51) Int. Cl.
*D06F 37/30* (2006.01)
*D06F 37/20* (2006.01)

(52) U.S. Cl. ............................ 68/140; 68/3 R; 68/12.16

(58) Field of Classification Search ................... 68/140, 68/3 R, 12.16
See application file for complete search history.

(56) References Cited

U.S. PATENT DOCUMENTS 5,040,285 A 8/1991 Williams et al.
(Continued)

FOREIGN PATENT DOCUMENTS

DE 1 460 914 9/1969
(Continued)

OTHER PUBLICATIONS

International Search Report and Written Opinion dated Feb. 17, 2009 (4).

(Continued)

*Primary Examiner* — Alexander Markoff
(74) *Attorney, Agent, or Firm* — Ked & Associates LLP

(57) ABSTRACT

A driving apparatus for a washing machine is disclosed which includes a dual-motor type motor. The driving apparatus includes a tub which contains washing water, and receives a drum such that the drum is rotatable, a dual rotor which includes an outer rotor including magnets supported by an inner peripheral surface of the outer rotor, the inner rotor arranged inside the outer rotor, the inner rotor including magnets supported by an outer peripheral surface of the inner rotator, a bearing housing which is formed at a rear wall of the tub in accordance with an insert molding method such that the bearing housing is integral with the tub, the bearing housing rotatably supporting a drum shaft connecting the drum and the dual rotor, a motor mounting bracket which is mounted to the rear wall of the tub, and a stator which includes a core arranged such that opposite surfaces of the core face the magnets of the outer rotor and the magnets of the inner rotor, respectively, an insulator made of an insulating material, the insulator enclosing the core, coils wound around the insulator, a molded member formed in accordance with an insert molding method to enclose the insulator and the coils such that the molded member is integral with the insulator and the coils while allowing the opposite surfaces of the core to be exposed, and a coupling member extending from the molded member, the coupling portion being mounted to the rear wall of the tub via the motor mounting bracket.

31 Claims, 7 Drawing Sheets

U.S. PATENT DOCUMENTS

| | | | |
|---|---|---|---|
| 6,049,930 | A | 4/2000 | Hisano et al. |
| 6,148,647 | A | 11/2000 | Kabeya et al. |
| 6,185,086 | B1 | 2/2001 | Tanaka et al. |
| 6,510,716 | B1 | 1/2003 | Kim et al. |
| 2002/0053225 | A1 | 5/2002 | Bierbach et al. |
| 2002/0194884 | A1 | 12/2002 | Heyder et al. |
| 2004/0163275 | A1 | 8/2004 | Hwang |
| 2004/0163428 | A1 | 8/2004 | Kim et al. |
| 2004/0245878 | A1 | 12/2004 | Kim et al. |
| 2005/0241346 | A1 | 11/2005 | Choi |

FOREIGN PATENT DOCUMENTS

| | | |
|---|---|---|
| DE | 42 02 775 | 8/1992 |
| DE | 197 33 546 | 4/1999 |
| DE | 100 40 319 | 9/2001 |
| EP | 1 055 765 | 11/2000 |
| EP | 1 094 144 | 4/2001 |
| EP | 1 094 145 | 4/2001 |
| EP | 1 493 859 | 1/2005 |
| KR | 2000-0031597 | 6/2000 |
| KR | 10-2001-0037671 | 5/2001 |
| KR | 2001-0097204 | 11/2001 |
| KR | 10-2005-0000245 | 1/2005 |
| WO | WO 2004/004098 | 1/2004 |
| WO | WO 2006/075903 | 7/2006 |
| WO | WO 2006/078114 | 7/2006 |

OTHER PUBLICATIONS

U.S. Office Action issued in U.S. Appl. No. 11/547,094 dated Oct. 4, 2011.

U.S. Office Action issued in U.S. Appl. No. 11/547,097 dated Oct. 7, 2011.

U.S. Office Action issued in U.S. Appl. No. 11/547,094 dated Jan. 18, 2012.

U.S. Office Action issued in U.S. Appl. No. 11/547,097 dated Jan. 18, 2012.

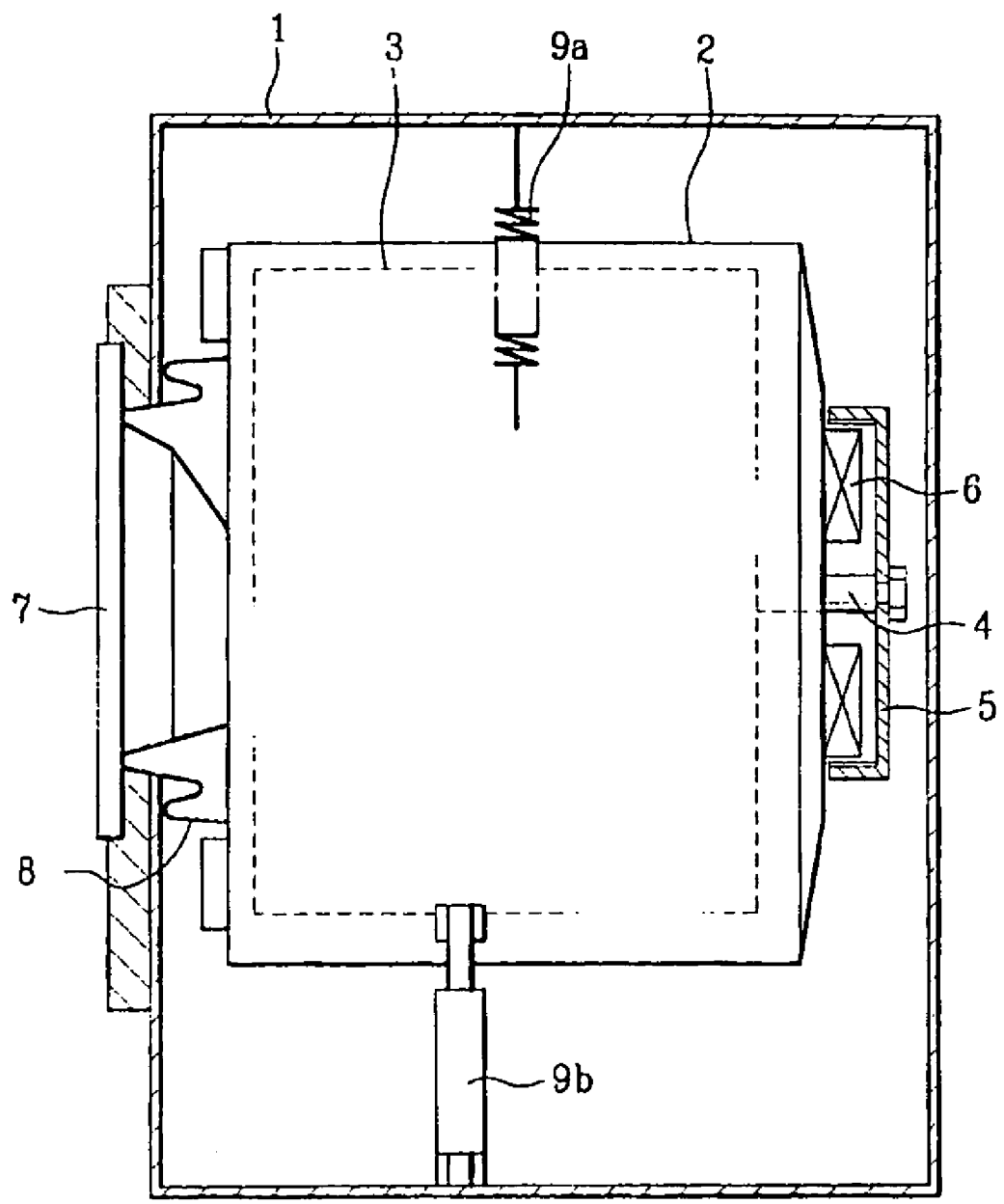
[Fig. 1]

[Fig. 2]
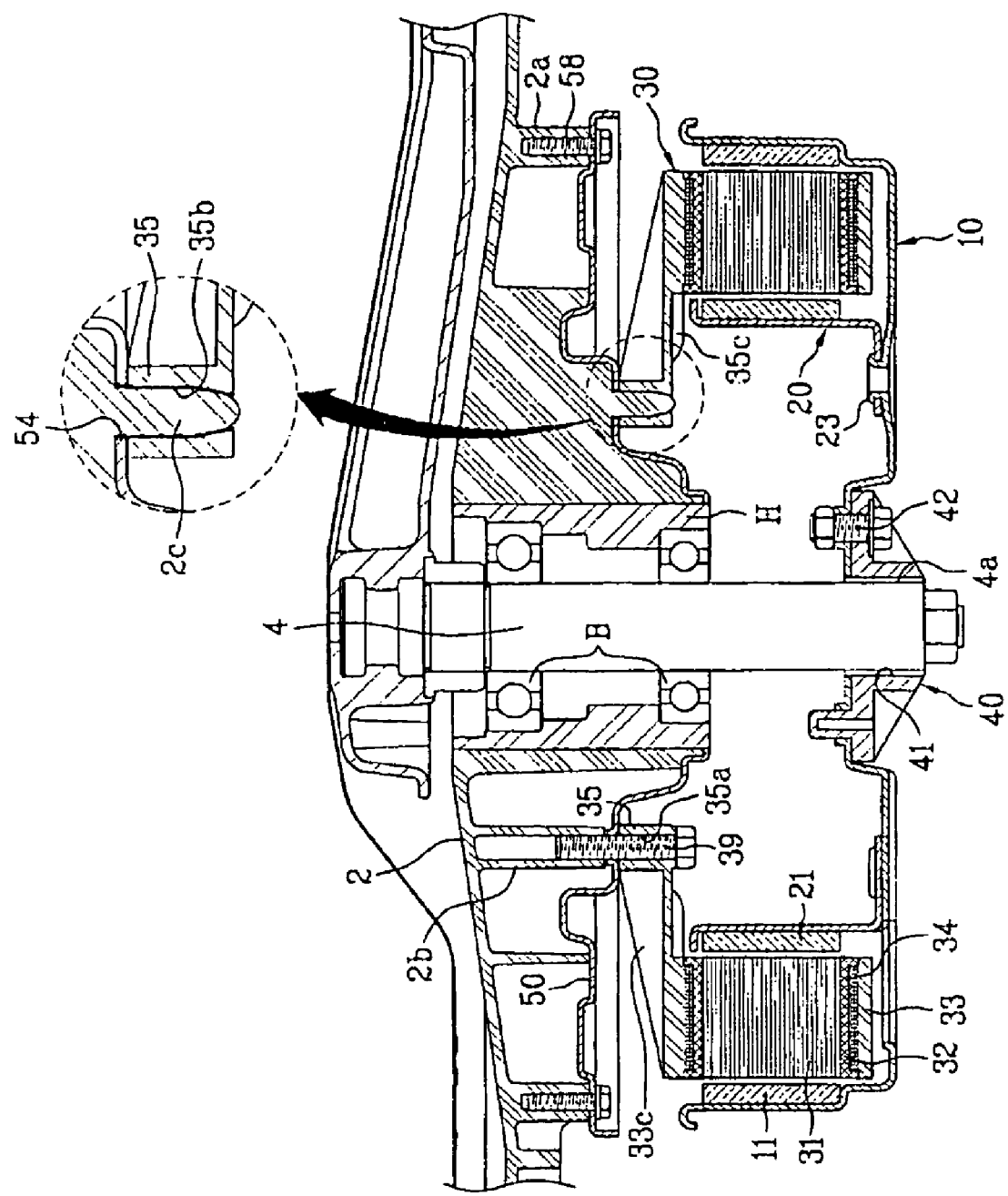

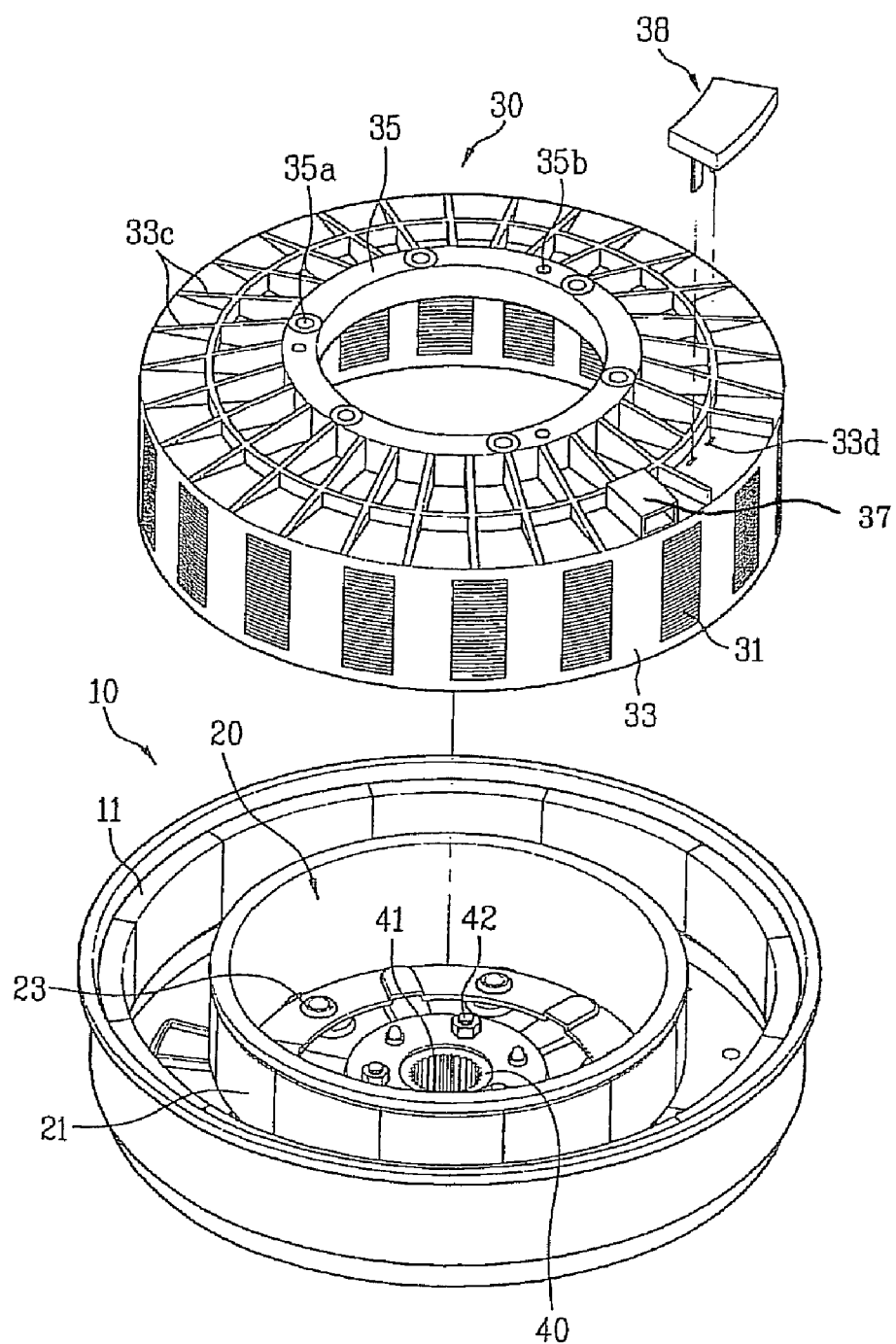
[Fig. 3]

[Fig. 4]
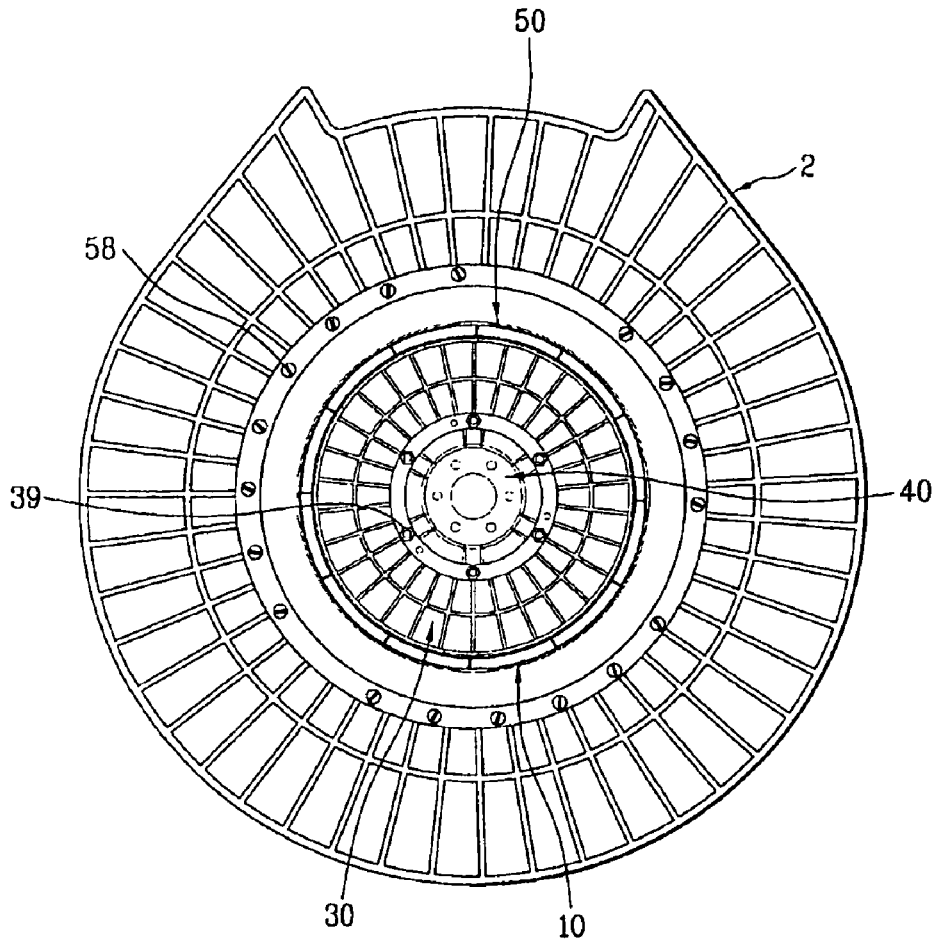
[Fig. 5]
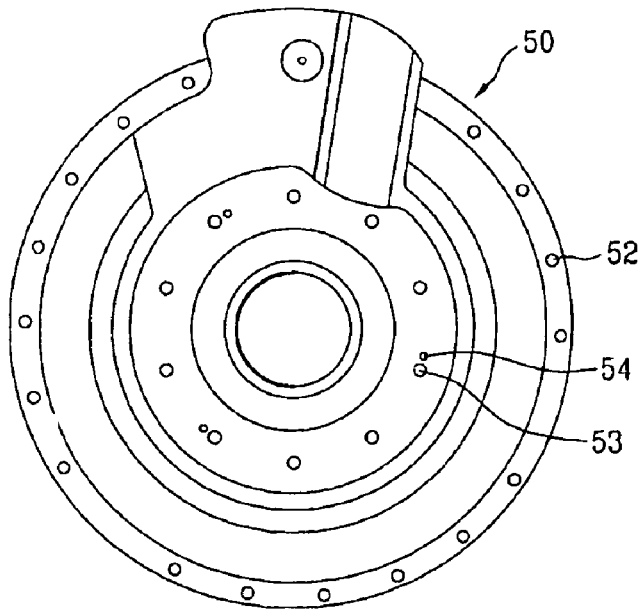

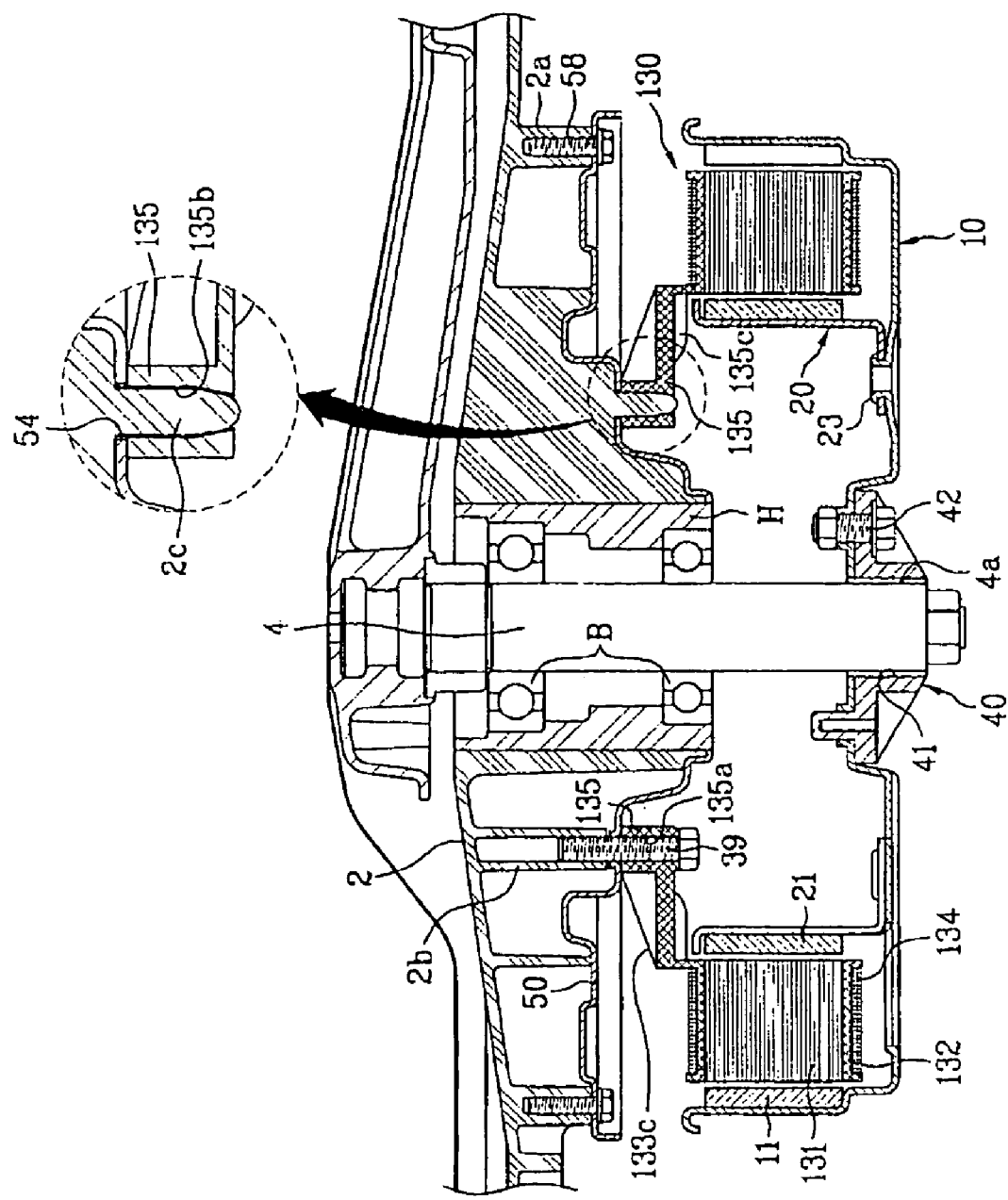
[Fig. 6]

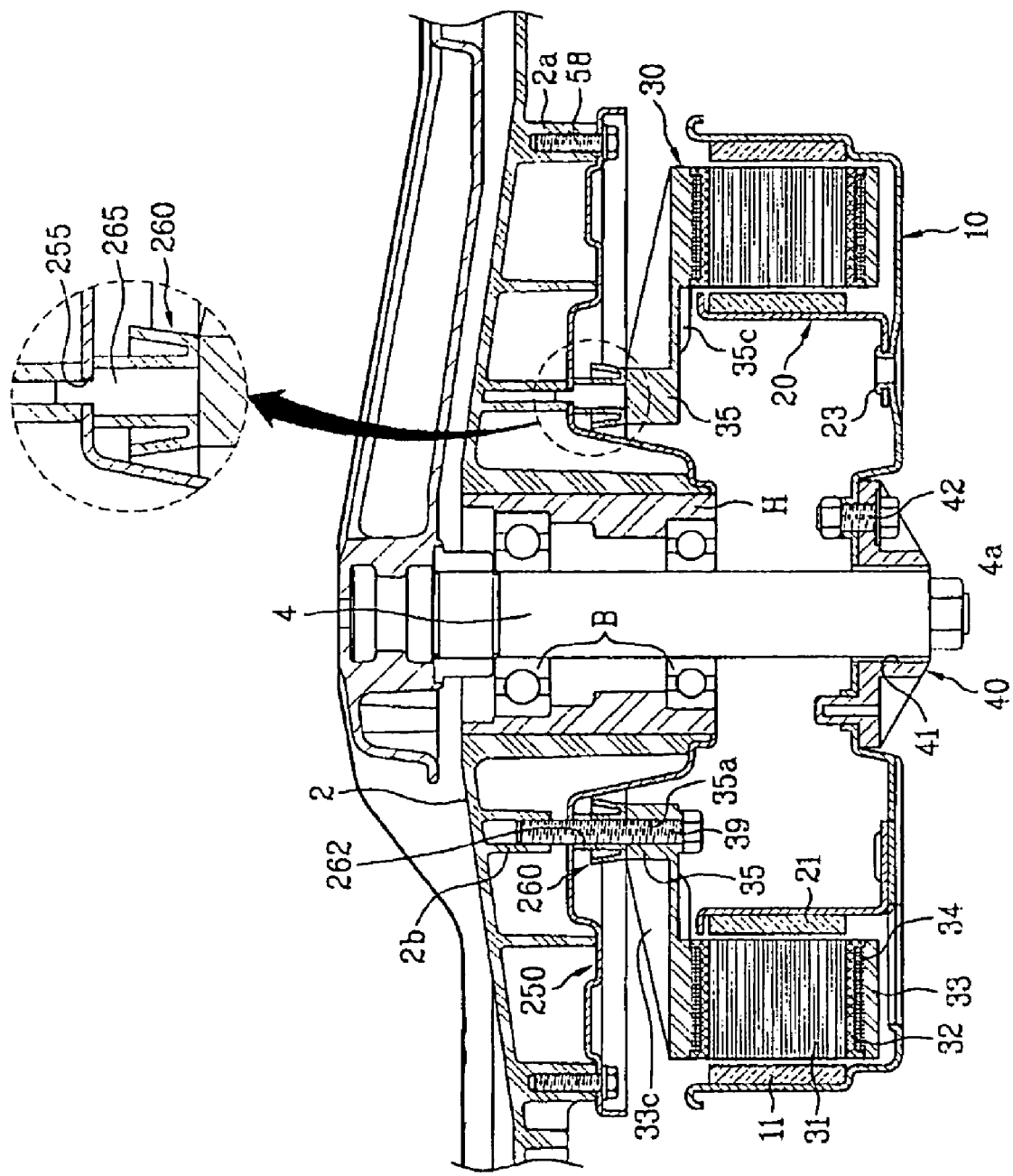
[Fig. 7]

[Fig. 8]
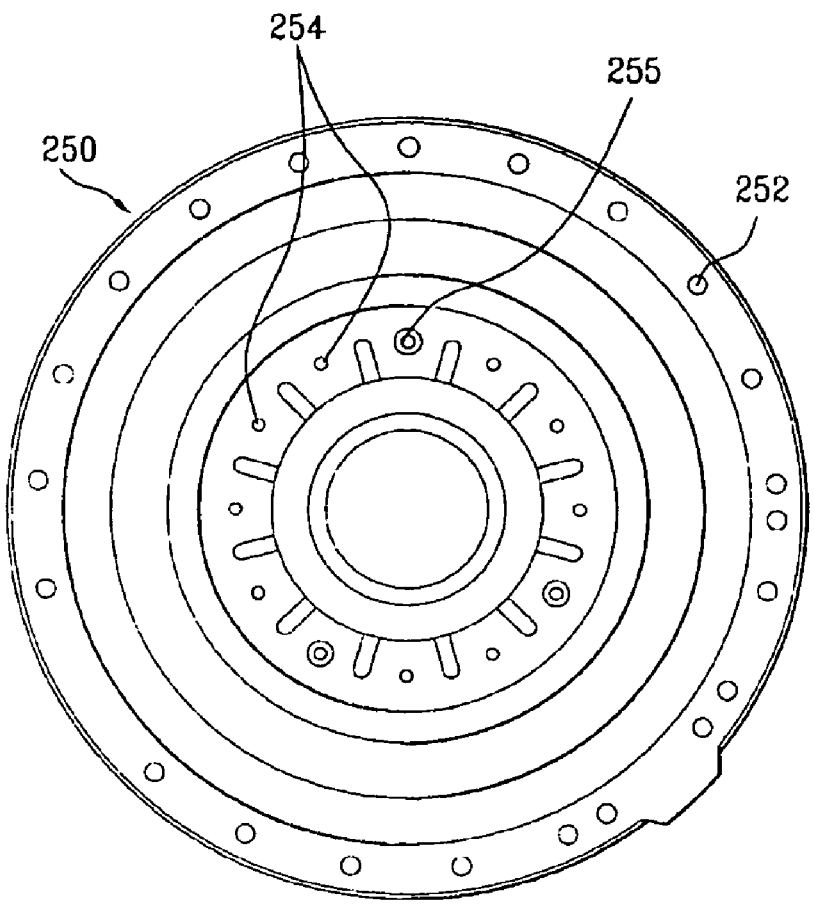
[Fig. 9]
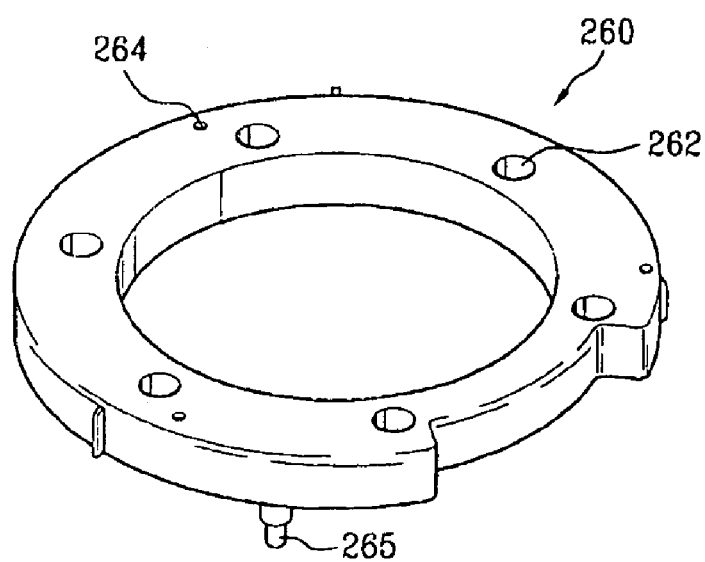

DRIVING APPARATUS FOR WASHING MACHINE

TECHNICAL FIELD

The present invention relates to a washing machine, and more particularly, to a driving apparatus for a washing machine wherein two rotors, which constitute a dual rotor, are arranged at opposite sides of a stator, respectively, to achieve all enhancement in torque.

BACKGROUND ART

Generally, a washing machine performs a washing operation using frictional forces generated between laundry and wash water contained in a drum rotated by a drive force from a motor, and the function of a detergent dissolved in the wash water. The drum is a washing tub in which wash water and laundry are contained. The drum is applicable to washing machines of any types, namely, irrespective of a drum type or a pulsator type.

Meanwhile, the driving system of the washing machine uses an indirect power transmission system in which the driving force of the motor is indirectly transmitted to the drum via a belt wound between a motor pulley and a drum pulley, or a direct power transmission system in which the driving force of the motor is directly transmitted to the drum.

The indirect power transmission system, in which the driving force of the motor is indirectly transmitted to the drum via the belt wound between the motor pulley and the drum pulley without being directly transmitted to the drum, has problems of loss of energy and great noise generated during the transmission of driving force. Taking into consideration such problems, use of washing machines using a directly-connected motor has increased.

FIG. 1 is a sectional view illustrating a structure of a conventional drum washing machine.

As shown in FIG. 1, a tub 2 is disposed in a cabinet 1. A drum 3 is centrally disposed in the tub 2 such that the drum 3 is rotatable.

A motor, which includes a rotor 5 and a stator 6, is arranged at the rear of the tub 2. The stator 6 is fixedly mounted to a rear wall of the tub 2. The rotor 5 surrounds the stator 6, and is connected to the drum 3 by a drum shaft 4 extending through the tub 2. Although not shown, magnets are arranged along an inner circumferential surface of the rotor 5 such that opposite polarities are alternately arranged.

A door 7 is mounted to a front side of the cabinet 1. A gasket 8 is arranged between the door 7 and the tub 2. A suspension spring 9a is arranged between the inner surface of the cabinet 1 at the top of the cabinet 1 and the outer surface of the tub 2 at the top of the tub 2, in order to support the tub 2. A friction damper 9b is arranged between the inner surface of the cabinet 1 at the bottom of the cabinet 1 and the outer surface of the tub 2 at the bottom of the tub 2, in order to attenuate vibrations generated at the tub 2 during a spin-drying operation.

A tub support (not shown), which is made of metal, is interposed between the rear wall of the tub 2 and the stator 6, in order to support the weight of the stator 6 and to maintain the concentricity of the stator 6. The tub support has a structure approximately similar to the profile of the rear wall of the tub 2. The tub support is fixed to the rear wall of the tub 2.

When the stator 6 receives electric power, it functions as an electromagnet. In this state, the rotor 5 is rotated by a rotating magnetic field formed between the stator 6 and the magnets of the rotor 5. The rotating force of the rotor 5 is transmitted to the drum via the drum shaft 4.

Recently-developed washing machines have a tendency to provide a large capacity. Due to such a tendency, the motor, which is used to rotate a drum in such a washing machine, must have increased power. For this reason, the sizes of the rotor and stator in the motor must be increased, thereby incurring a problem of a great increase in the size and weight of the motor.

In order to solve this problem, the applicant proposed a washing machine including a dual-rotor type motor, as disclosed in Korean Patent Laid-open Publication No. 2001-0097204 (published on Nov. 8, 2001). In the disclosed dual-rotor type motor, coils are wound on a stator at the inside and outside of the stator, respectively. An inner rotor and an outer rotor are arranged at the inside and outside of the stator, respectively, such that a predetermined gap is defined between each rotor and the stator. By virtue of such a dual rotor structure, the motor can have increased power.

However, such a dual-rotor type motor must be more firmly mounted to a washing machine or the like, correspondingly to the increased-power thereof.

DISCLOSURE OF INVENTION

Technical Problem

An object of the present invention devised to solve the above-mentioned problems lies in providing a driving apparatus for a washing machine which has a structure enabling the driving apparatus to be stably fixed to a tub of the washing machine, and to generate high power.

Technical Solution

In accordance with one aspect of the present invention, the present invention provides a driving apparatus for a washing machine comprising: a tub which contains washing water, and receives a drum such that the drum is rotatable; a dual rotor which includes an outer rotor including magnets supported by an inner peripheral surface of the outer rotor, and an inner rotor arranged inside the outer rotor, the inner rotor including magnets supported by an outer peripheral surface of the inner rotor; a bearing housing which is formed at a rear wall of the tub in accordance with an insert molding method such that the bearing housing is integral with the tub, the bearing housing rotatably supporting a drum shaft connecting the drum and the dual rotor; a motor mounting bracket which is mounted to the rear wall of the tub; and a stator which is mounted to the rear wall of the tub via the motor mounting bracket such that the stator is arranged between the outer rotor and the inner rotor, the stator generating magnetic energy using electrical energy supplied from an external of the stator, to rotate the dual rotor.

The stator may include a core arranged such that opposite surfaces of the core face the magnets of the outer rotor and the magnets of the inner rotor, respectively, an insulator made of an insulating material, the insulator enclosing the core, coils wound around the insulator, a molded member formed in accordance with an insert molding method to enclose the insulator and the coils such that the molded member is integral with the insulator and the coils while allowing the opposite surfaces of the core to be exposed, and a coupling member extending from the molded member, the coupling portion being mounted to the rear small of the tub via the motor mounting bracket.

Alternatively, the stator may include a core arranged such that opposite surfaces of the core face the magnets of the outer rotor and the magnets of the inner rotor, respectively, an insulator enclosing the core, coils wound around the insulator, and a coupling member extending from the molded member, the coupling member being mounted to the rear wall of the tub via the motor mounting bracket.

In accordance with another aspect, the present invention provides a driving apparatus for a washing machine comprising: a tub which contains washing water, and receives a drum such that the drum is rotatable; a dual rotor which includes an outer rotor including magnets supported by an inner peripheral surface of the outer rotor, and an inner rotor arranged inside the outer rotor, the inner rotor including magnets supported by an outer peripheral surface of the inner rotor; a bearing housing which is formed at a rear wall of the tub in accordance with an insert molding method such that the bearing housing is integral with the tub, the bearing housing rotatably supporting a drum shaft connecting the drum and the dual rotor; a motor mounting bracket which is mounted to the rear wall of the tub; and a stator which is mounted to the motor mounting bracket such that the stator is arranged between the outer rotor and the inner rotor, the stator generating magnetic energy using electrical energy supplied from an external of the stator, to rotate the dual rotor.

In accordance with another aspect, the present invention provides a driving apparatus for a washing machine comprising: a tub which contains washing water, and receives a drum such that the drum is rotatable, the tub including a plurality of bracket mounting bosses formed at a rear wall of the tub, and a plurality of stator mounting bosses formed at the rear wall of the tub; a dual rotor which includes an outer rotor including magnets supported by an inner peripheral surface of the outer rotor, and an inner rotor arranged inside the outer rotor, the inner rotor including magnets supported by an outer peripheral surface of the inner rotor; a bearing housing which is formed at a rear wall of the tub in accordance with an insert molding method such that the bearing housing is integral with the tub, the bearing housing rotatably supporting a drum shaft connecting the drum and the dual rotor; a motor mounting bracket which is mounted to the rear wall of the tub, and is formed with a plurality of outer coupling holes respectively corresponding to the bracket mounting bosses such that bolts are fastened through the outer coupling holes and the corresponding bracket mounting bosses, and a plurality of inner coupling holes respectively corresponding to the stator mounting bosses such that bolts are fastened through the inner coupling holes and the stator mounting bosses; and a stator which includes a core arranged such that opposite surfaces of the core face the magnets of the outer rotor and the magnets of the inner rotor, respectively, an insulator made of an insulating material, the insulator enclosing the core, coils wound around the insulator, a molded member formed in accordance with an insert molding method to enclose the insulator and the coils such that the molded member is integral with the insulator and the coils while allowing the opposite surfaces of the core to be exposed, and a coupling member extending from the molded member, the coupling portion being mounted to the rear wall of the tub via the motor mounting bracket.

In accordance with another aspect, the present invention provides a driving apparatus for a washing machine comprising: a tub which contains washing water, and receives a drum such that the drum is rotatable, the tub including a plurality of bracket mounting bosses formed at a rear wall of the tub; a dual rotor which includes an outer rotor including magnets supported by an inner peripheral surface of the outer rotor, and an inner rotor arranged inside the outer rotor, the inner rotor including magnets supported by an outer peripheral surface of the inner rotor; a bearing housing which is formed at a rear wall of the tub in accordance with an insert molding method such that the bearing housing is integral with the tub, the bearing housing rotatably supporting a drum shaft connecting the drum and the dual rotor; a motor mounting bracket which is mounted to the rear wall of the tub, and is formed with a plurality of outer coupling holes respectively corresponding to the bracket mounting bosses such that bolts are fastened through the outer coupling holes and the corresponding bracket mounting bosses, and a plurality of inner coupling holes arranged inside the outer coupling holes; and a stator which includes a core arranged such that opposite surfaces of the core face the magnets of the outer rotor and the magnets of the inner rotor, respectively, an insulator made of an insulating material, the insulator enclosing the core, coils wound around the insulator, a molded member formed in accordance with an insert molding method to enclose the insulator and the coils such that the molded member is integral with the insulator and the coils while allowing the opposite surfaces of the core to be exposed, and a coupling member extending from the molded member, the coupling portion being mounted to the motor mounting bracket.

In accordance with another aspect, the present invention provides a driving apparatus for a washing machine comprising: a tub which contains washing water, and receives a drum such that the drum is rotatable, the tub including a plurality of bracket mounting bosses formed at a rear wall of the tub; a dual rotor which includes an outer rotor including magnets supported by an inner peripheral surface of the outer rotor, and an inner rotor arranged inside the outer rotor, the inner rotor including magnets supported by an outer peripheral surface of the inner rotor; a bearing housing which is formed at a rear wall of the tub in accordance with an insert molding method such that the bearing housing is integral with the tub, the bearing housing rotatably supporting a drum shaft connecting the drum and the dual rotor; a motor mounting bracket which is mounted to the rear wall of the tub, and is formed with a plurality of outer coupling holes respectively corresponding to the bracket mounting bosses such that bolts are fastened through the outer coupling holes and the corresponding bracket mounting bosses, and a plurality of inner coupling holes arranged inside the outer coupling holes; and a stator which includes a core arranged such that opposite surfaces of the core face the magnets of the outer rotor and the magnets of the inner rotor, respectively, an insulator enclosing the core, coils wound around the insulator, and a coupling member extending from the insulator, the coupling portion being mounted to the rear wall of the tub via the motor mounting bracket.

In accordance with still another aspect, the present invention provides a driving apparatus for a washing machine comprising: a tub which contains washing water, and receives a drum such that the drum is rotatable, the tub including a plurality of bracket mounting bosses formed at a rear wall of the tub; a dual rotor which includes an outer rotor including magnets supported by an inner peripheral surface of the outer rotor, and an inner rotor arranged inside the outer rotor, the inner rotor including magnets supported by an outer peripheral surface of the inner rotor; a bearing housing which is formed at a rear wall of the tub in accordance with an insert molding method such that the bearing housing is integral with the tub, the bearing housing rotatably supporting a drum shaft connecting the drum and the dual rotor; a motor mounting bracket which is mounted to the rear wall of the tub, and is formed with a plurality of outer coupling holes respectively corresponding to the bracket mounting bosses such that bolts are fastened through the outer coupling holes and the corresponding bracket mounting bosses, and a plurality of inner coupling holes arranged inside the outer coupling holes; and a stator which includes a core arranged such that opposite surfaces of the core face the magnets of the outer rotor and the magnets of the inner rotor, respectively, an insulator enclosing the core, coils wound around the insulator, and a coupling member extending from the insulator, the coupling portion being mounted to the motor mounting bracket.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a longitudinal sectional view schematically illustrating a structure of a drum washing machine to which a conventional outer rotor type motor is applied;

FIG. 2 is a longitudinal sectional view schematically illustrating a structure of a driving apparatus which includes a dual-rotor type motor in accordance with an embodiment of the present invention;

FIG. 3 is an exploded perspective view illustrating the dual-rotor type motor shown in FIG. 2;

FIG. 4 is a rear view of a tub, illustrating a mounting structure of the driving apparatus shown in FIG. 2;

FIG. 5 is a front view illustrating a motor mounting bracket in the driving apparatus shown in FIG. 2;

FIG. 6 is a longitudinal sectional view illustrating a driving apparatus for a washing machine according to another embodiment of the present invention;

FIG. 7 is a longitudinal sectional view illustrating a driving apparatus for a washing machine according to another embodiment of the present invention;

FIG. 8 is a front view illustrating a motor mounting bracket in the driving apparatus shown in FIG. 7; and FIG. 9 is a perspective view illustrating a structure of an auxiliary bracket in the driving apparatus shown in FIG. 7.

BEST MODE FOR CARRYING OUT THE INVENTION

Reference will now be made in detail to the preferred embodiments of the present invention associated with a driving apparatus for a washing machine, examples of which are illustrated in the accompanying drawings.

Referring to FIGS. 2 and 3, a driving apparatus for a washing machine according to a preferred embodiment of the present invention is illustrated. As shown in FIGS. 2 and 3, a drum shaft 4 is mounted to a central portion of the rear wall of a drum 3 (FIG. 1) such that the drum shaft 4 extends rearwards. A bearing housing H is insert-molded at a central portion of the rear wall of a tub 2 (FIG. 1) such that the bearing housing H is integral with the tub 2. Inner and outer bearings B are fitted in the bearing housing H.

A motor, which is adapted to rotate the drum shaft 4, is mounted to the rear wall of the tub 2. The motor is a dual-rotor type motor which includes an outer rotor 10, an inner rotor 20, and a stator 30. The stator 30 is fixed to the rear wall of the tub 2. The outer rotor 10 and inner rotor 20 are arranged at opposite sides of the stator 30, respectively, such that gaps are defined between the outer rotor 10 and the inner peripheral surface of the stator 30 and between the inner rotor 20 and the outer peripheral surface of the stator 30, respectively.

A bushing 40, which is made of an insulating resin material, is mounted to a central portion of the outer rotor 10. The drum shaft 4 is fixedly mounted to the bushing 40. The mounting of the bushing 40 to the central portion of the outer rotor 10 is achieved by fasteners such as bolts 42. Of course, the bushing 40 may be formed integrally with the outer rotor 10, using an insert molding method.

The bushing 40 is centrally provided with a hole in which the drum shaft 4 is fitted. Serrations 41 are formed at the inner surface of the hole. The serrations 41 are engaged with serrations 4a formed at the outer surface of the drum shaft 4.

A plurality of magnets 11 are arranged along an inner peripheral surface of the outer rotor 10 such that N and S-poles are alternately arranged. A plurality of magnets 21 are arranged along an outer peripheral surface of the outer rotor 10 such that N and S-poles are alternately arranged. The magnets 21 face the magnets 11. Preferably, the outer rotor 10 and inner rotor 20 are coupled to each other at lower portions thereof contacting each other, using caulks 23 and caulking holes formed in accordance with a pressing and caulking process.

Although the outer rotor 10 and inner rotor 20 may be injection-molded, it is preferred that the outer rotor 10 and inner rotor 20 be made of a metal material, so as to function as back yokes. Of course, where the outer rotor 10 and inner rotor 20 are injection-molded using a resin material, back yokes made of metal must be attached to the outer rotor 10 and inner rotor 20, to establish magnetic paths.

Meanwhile, the stator 30 includes a plurality of core segments 31 which are separate from one another, an insulator 32 which encloses the core 31, and is made of an insulating resin material, coils 34 which are wound around the insulator 32, and a molded member 33 which is molded using an insert molding method to enclose the insulator 32 and coils 34. The insulator 32 may be dispensed with, so long as enamel is coated over the outer surfaces of the coils 34, to ensure desired electrical insulation.

The molded member 33 is also provided with a coupling portion 35 for coupling the molded member 33 to the tub 2. The coupling portion 35 extends radially inwardly from an inner peripheral surface of one end of the molded member 33. A plurality of coupling holes 35a and a plurality of positioning holes 35b are formed through the coupling portion 35.

Of course, the coupling portion 35 may extend radially outwardly from the molded member 33.

Preferably, the coupling portion 35 is formed in accordance with an insert molding method such that the coupling portion 35 is integral with the molded member 33. However, the coupling portion 35 may be formed separately from the molded member 33. In this case, the coupling portion 35 is coupled to the molded member 33. In this case, the coupling portion 35 may be made of a metal or resin material identical to or different from that of the molded member.

A reinforcing member is provided at the outer surface of the molded member 33, in order to increase the strength of the molded member 33. Preferably, the reinforcing member comprises a plurality of reinforcing ribs 33c. Also, reinforcing ribs 35c are preferably formed at an inner corner where the molded member 33 meets the coupling portion 35. Provided, rotation of the inner rotor 20 should not be interfered with by the reinforcing ribs 35c.

Of course, in place of the reinforcing ribs 33c and 35c, a reinforcing bracket (not shown), which is made of metal and has an annular shape, may be attached to the inner or outer surface of the molded member 33, in order to increase the strength of the molded member 33.

A Hall sensor 38 is arranged at one side of the stator 30, to detect the rotating speed of the rotors. The Hall sensor 38 has sensor terminals which are fitted in holes 33d formed in the top of the stator 30 at one side of the stator 30, to detect the rotating speed of the rotors. A connector 37 is formed at the molded member 33 such that they are integral, in order to supply electric power to each coil 34 of the stator 30.

As shown in FIGS. 2, 4, and 5, the stator 30 is fixedly mounted to the rear wall of the tub 2 via a motor mounting bracket 50.

In detail, a plurality of bracket mounting bosses 2a are formed on the rear wall of the tub 2 at a position radially spaced apart from the axis of the tub 2 such that the bracket mounting bosses 2a are circumferentially arranged while being circumferentially spaced apart from one another by a predetermined distance. Also, a plurality of uniformly-spaced stator mounting bosses 2b are formed on the rear wall of the tub 2 inside the bracket mounting bosses 2a, to mount the stator 30 to the rear wall of the tub 2.

A plurality of positioning protrusions 2c are formed at the rear wall of the tub 2. The positioning protrusions 2c determine the positions of the motor mounting bracket 50 and stator 30 such that the motor mounting bracket 50 and stator 30 are concentrically arranged. Positioning holes 54 are formed through the motor mounting bracket 50 at positions corresponding to the positioning protrusions 2c, respectively. The positions of the positioning holes 54 also correspond to the positioning holes 35b of the stator 30, respectively.

Each positioning protrusion 2c preferably has a conical end so that the positioning protrusion 2c can be easily inserted into the corresponding positioning hole 35b of the stator 30.

Each positioning hole 35b of the stator 30 preferably has a shape and a size identical to those of each positioning protrusion 2c such that the positioning protrusion 2c is tightly fitted in the positioning hole 35b without any gap after the insertion thereof.

That is, the portion of the positioning groove 35b, in which a body portion of the positioning protrusion 2c is received, preferably has a cylindrical shape having a uniform diameter corresponding to that of the body portion, and the portion of the positioning groove 35b, in which the conical end portion of the positioning protrusion 2c is received, preferably has a conical shape corresponding to that of the guide portion and having a gradually-reduced diameter. Preferably, each positioning groove 35b of the stator 30 has a diameter smaller than that of the associated coupling hole 35a.

Reversely to the above-described case, the positioning protrusions may be formed at the stator 30, and the positioning holes may be formed at the motor mounting bracket 50 and tub 2.

As shown in FIGS. 4 and 5, the motor mounting bracket 50 is made of an approximately-circular metal plate, and is provided with a plurality of uniformly-spaced inner coupling holes 53 and a plurality of uniformly-spaced outer coupling holes 52 at positions corresponding to the bracket mounting bosses 2a and stator mounting bosses 2b of the tub 2, respectively When the positioning protrusions 2c of the tub 2 are inserted into the positioning holes 54 of the motor mounting bracket 50, respectively, the outer coupling holes 52 of the motor mounting bracket 50 are accurately aligned with the bracket mounting bosses 2a of the tub 2, respectively. In this state, the motor mounting bracket 50 can be mounted to the rear wall of the tub 2 by fastening bolts 58 through the outer coupling holes 52 and bracket mounting bosses 2a.

Thereafter, the stator 30 is coupled to the rear wall of the motor-mounting bracket 50 such that the positioning protrusions 2c are inserted into the positioning holes 35b of the stator 30, respectively. In this state, the stator 30 can be firmly mounted to the rear wall of the tub 2 by fastening bolts 39 through the coupling holes 35a of the stator 30, the inner coupling holes 53 of the motor mounting bracket 50, and the stator mounting bosses 2b of the tub 2.

Of course, differently from the above-described embodiment, the mounting of the stator 30 to the motor mounting bracket 50 can be achieved by fastening the bolts 39 only through the inner coupling holes 53 of the motor mounting bracket 50 and the coupling holes 35a of the stator 30. That is, the stator 30 can be directly mounted to the rear surface of the motor mounting bracket 50 without being mounted to the tub 2.

Meanwhile, where the stator 30 is mounted to the rear wall of the tub 2 via the motor mounting bracket 50, as described above, there are advantages in that it is possible to increase the rigidity of the tub 2, which is made of a plastic mold, and to firmly fix the stator 30 to the tub 2.

The end of the drum shaft 4 is coupled to the bushing 40 mounted to the outer rotor 10 after the mounting of the stator 30 to the rear wall of the tub 2, as described above. Thus, the mounting of the motor is completed.

FIG. 6 is a sectional view illustrating a structure of a driving apparatus for a washing machine according to another embodiment of the present invention.

As shown in FIG. 6, the basic configuration of the driving apparatus according to this embodiment is identical to that of the above-described embodiment.

Provided, the driving apparatus of this embodiment is different from that of the above-described embodiment in that no separate molded member is provided at a stator 130 constituting a motor, and a coupling portion 135 extends directly from an insulator 132 arranged around a core 131.

That is, as shown in FIG. 6, in the stator 130, the coupling portion 135 extends radially inwardly from an end of the insulator 132 adjacent to the tub 2. A plurality of uniformly-spaced coupling holes 135a and a plurality of uniformly-spaced positioning holes 135b are formed through the coupling portion 135. Of course, differently from the illustrated case, the coupling portion 135 may extend radially outwardly from the insulator 132.

The coupling portion 135 is preferably formed integrally with the insulator 132. However, the coupling portion 135 may be fabricated in the form of a metal frame, separately from the insulator 132. In this case, the coupling portion 135 is coupled to the insulator 132.

Since the mounting of the coupling portion 135 of the insulator 132 can be achieved in the same manner as in the above-described embodiment, no detailed description thereof will be given.

FIGS. 7 to 9 illustrate a driving apparatus for a washing machine according to another embodiment of the present invention.

The basic configuration of the driving apparatus according to this embodiment is identical to that of the first embodiment.

Provided, the driving apparatus of this embodiment is different from that of the first embodiment in terms of the structure for mounting the stator 30 to the tub 2.

In the driving apparatus of the above-described embodiment, the portion of the tub 2 corresponding to a region where the connector 37 (FIG. 3) and hall sensor 38 (FIG. 3) are arranged may be slightly inwardly depressed because the connector 37 is formed at the surface of the stator 30 contacting the tub 2. In this case, the rigidity of the tub 2 may be degraded at the depressed portion.

In this embodiment, accordingly, an auxiliary bracket 260 having a predetermined thickness is interposed between the motor mounting bracket 250 and the stator 30, to form a space between the rear wall of the tub 2 and the stator 30, and thus, to prevent the tub 2 from being formed with a depressed portion.

A plurality of positioning pins 265 are formed at one surface of the auxiliary bracket 260 such that the positioning pins 265 are circumferentially arranged while being circumferentially spaced apart from one another by a predetermined distance. The positioning pins 265 position the auxiliary bracket 260 to be concentric to the motor mounting bracket 250 when the auxiliary bracket 260 is mounted to the motor mounting bracket 250. A plurality of bolt coupling holes 262 are formed through the auxiliary bracket 260 at positions corresponding to the coupling holes 35a of the stator 30 and the stator mounting bosses 2b of the tub 2, respectively, such that the bolt coupling holes 262 are circumferentially arranged while being circumferentially spaced apart from one another by a predetermined distance.

In order to concentrically position the auxiliary bracket 260 and stator 30, a plurality of positioning pins (not shown) are preferably protruded from the stator 30. Also, positioning holes 264 are preferably formed at the auxiliary bracket 260 such that the positioning holes 264 are circumferentially arranged while being circumferentially spaced apart from one another by a predetermined distance.

The auxiliary bracket 260 is preferably made of an aluminum alloy.

The driving apparatus for a washing machine according to the present invention has advantages as follows.

First, in the driving apparatus of the present invention, inner and outer rotors are arranged at the inside and outside of a stator, respectively. Accordingly, it is possible to greatly increase the power of the driving apparatus, namely, a motor, without a considerable increase in the size and weight of the motor.

Second, in accordance with the present invention, the core and insulator of the stator are supported by a molded member. Accordingly, it is possible to easily implement a structure for coupling the stator to the washing machine.

Third, where the molded member encloses the core, insulator, and coils of the stator, the stator can have superior waterproofness. Accordingly, where the motor of the present invention is applied to an apparatus using water, for example, a washing machine, there is little or no possibility that a short circuit occurs in the stator due to water contacting the stator. Accordingly, an enhancement in durability is achieved.

Fourth, since the stator is mounted to the rear all of the tub via the motor mounting bracket, the mounting of the stator to the tub can be firmly and easily achieved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention is applicable to a driving apparatus for rotating a drum of a washing machine.

The invention claimed is:

1. A driving apparatus for a washing machine, comprising:
   a tub configured to contain washing water, and receive a drum such that the drum is rotatable therein;
   a dual rotor that includes an outer rotor including a plurality of magnets supported by an inner peripheral surface of the outer rotor, and an inner rotor arranged inside the outer rotor, the inner rotor including a plurality of magnets supported by an outer peripheral surface of the inner rotor;
   a bearing housing formed at a rear wall of the tub such that the bearing housing is integral with the tub, the bearing housing rotatably supporting a drum shaft that connects the drum and the dual rotor;
   a motor mounting bracket mounted to the rear wall of the tub;
   a stator mounted to the rear wall of the tub via the motor mounting bracket such that the stator is arranged between the outer rotor and the inner rotor and rotates the dual rotor; and
   an auxiliary bracket interposed between the stator and the motor mounting bracket.

2. The driving apparatus according to claim 1, wherein the stator includes:
   a core arranged such that opposite surfaces of the core face the plurality of magnets of the outer rotor and the plurality of magnets of the inner rotor, respectively;
   an insulator made of an insulating material, the insulator enclosing the core;
   a plurality of coils wound around the insulator;
   a molded member that encloses the insulator and the plurality of coils such that the molded member is integral with the insulator and the plurality of coils while allowing the opposite surfaces of the core to be exposed; and
   a coupling member that extends from the molded member, the coupling member being mounted to the rear wall of the tub via the motor mounting bracket.

3. The driving apparatus according to claim 1, wherein the stator includes:
   a core arranged such that opposite surfaces of the core face the plurality of magnets of the outer rotor and the plurality of magnets of the inner rotor, respectively;
   an insulator enclosing the core;
   a plurality of coils wound around the insulator; and
   a coupling member that extends from the molded member, the coupling member being mounted to the rear wall of the tub via the motor mounting bracket.

4. The driving apparatus according to claim 1, further comprising:
   a plurality of bracket mounting bosses formed at the rear wall of the tub; and
   a plurality of outer coupling holes formed through the motor mounting bracket such that the plurality of outer coupling holes corresponds to the plurality of bracket mounting bosses, respectively, wherein the motor mounting bracket is mounted to the tub by a plurality of bolts fastened through the plurality of bracket mounting bosses of the tub and the plurality of outer coupling holes of the motor mounting bracket.

5. The driving apparatus according to claim 4, further comprising:
   a plurality of stator mounting bosses formed at the rear wall of the tub;
   a plurality of inner coupling holes formed through the motor mounting bracket such that the plurality of inner coupling holes corresponds to the plurality of stator mounting bosses, respectively; and
   a plurality of coupling holes formed at the stator such that the plurality of coupling holes corresponds to the plurality of stator mounting bosses, respectively, and corresponds to the plurality of inner coupling holes, respectively, wherein the stator is mounted to the tub by a plurality of bolts fastened through the plurality of stator mounting bosses, the plurality of inner coupling holes, and the plurality of coupling holes, in this order.

6. The driving apparatus according to claim 1, further comprising:
a positioning device that determines positions of the motor mounting bracket and the stator to be fixed with respect to the tub such that the stator is concentrically coupled to the drum shaft.

7. The motor according to claim 6, wherein the positioning device includes:
at least one positioning protrusion that protrudes from the tub;
a first positioning hole formed through the motor mounting bracket such that the first positioning hole receives the at least one positioning protrusion; and
a second positioning hole formed through the stator such that the second positioning hole receives the at least one positioning protrusion.

8. The driving apparatus according to claim 6, wherein the positioning device includes:
at least one first positioning hole formed at the tub;
at least one second positioning hole formed through the motor mounting bracket such that the at least one second positioning hole corresponds to the at least one first positioning hole; and
at least one positioning protrusion that protrudes from the stator such that the at least one positioning protrusion extends through the at least one first positioning hole and the at least one second positioning hole.

9. The driving apparatus according to claim 5,
wherein the auxiliary bracket includes a plurality of bolt coupling bosses respectively corresponding to the plurality of stator mounting bosses, the plurality of inner coupling holes, and the plurality of coupling holes.

10. The driving apparatus according to claim 1, wherein the auxiliary bracket has an annular shape.

11. The driving apparatus according to claim 1, wherein the auxiliary bracket is made of an aluminum material.

12. The driving apparatus according to claim 9, further comprising:
a positioning device that determines positions of the auxiliary bracket and the stator to be fixed with respect to the tub such that the stator is concentrically coupled to the drum shaft.

13. The driving apparatus according to claim 12, wherein the positioning device includes:
at least one first positioning hole formed at the tub;
a first positioning pin that protrudes from the auxiliary bracket toward the tub such that the first positioning pin is inserted into the at least one first positioning hole;
at least one second positioning hole formed through the auxiliary bracket; and
a second positioning pin that protrudes from the stator toward the auxiliary bracket such that the second positioning pin is inserted into the at least one second positioning hole.

14. The driving apparatus according to claim 2, wherein the molded member of the stator includes a reinforcing member that increases a strength of the molded member.

15. The driving apparatus according to claim 14, wherein the reinforcing member comprises a plurality of reinforcing ribs formed at an outer surface of the molded member such that the plurality of reinforcing ribs is integral with the molded member.

16. A driving apparatus for a washing machine, comprising:
a tub configured to contain washing water, and receive a drum such that the drum is rotatable therein;
a dual rotor that includes an outer rotor including a plurality of magnets supported by an inner peripheral surface of the outer rotor, and an inner rotor arranged inside the outer rotor, the inner rotor including a plurality of magnets supported by an outer peripheral surface of the inner rotor;
a bearing housing formed at a rear wall of the tub such that the bearing housing is integral with the tub, the bearing housing rotatably supporting a drum shaft that connects the drum and the dual rotor;
a motor mounting bracket mounted to the rear wall of the tub;
a stator mounted to the motor mounting bracket such that the stator is arranged between the outer rotor and the inner rotor and rotates the dual rotor; and
an auxiliary bracket interposed between the stator and the motor mounting bracket.

17. The driving apparatus according to claim 16, wherein the stator includes:
a core arranged such that opposite surfaces of the core face the plurality of magnets of the outer rotor and the plurality of magnets of the inner rotor, respectively;
an insulator made of an insulating material, the insulator enclosing the core;
a plurality of coils wound around the insulator;
a molded member that encloses the insulator and the plurality of coils such that the molded member is integral with the insulator and the plurality of coils while allowing the opposite surfaces of the core to be exposed; and
a coupling member that extends from the molded member, the coupling member being mounted to the rear wall of the tub via the motor mounting bracket.

18. The driving apparatus according to claim 16, wherein the stator includes:
a core arranged such that opposite surfaces of the core face the plurality of magnets of the outer rotor and the plurality of magnets of the inner rotor, respectively;
an insulator enclosing the core;
a plurality of coils wound around the insulator; and
a coupling member that extends from the insulator, the coupling member being mounted to the rear wall of the tub via the motor mounting bracket.

19. The driving apparatus according to claim 16, further comprising:
a plurality of bracket mounting bosses formed at the rear wall of the tub; and
a plurality of outer coupling holes formed through the motor mounting bracket such that the plurality of outer coupling holes corresponds to the plurality of bracket mounting bosses, respectively, wherein the motor mounting bracket is mounted to the tub by a plurality of bolts fastened through the plurality of bracket mounting bosses of the tub and the plurality of outer coupling holes of the motor mounting bracket.

20. The driving apparatus according to claim 19, further comprising:
a plurality of inner coupling holes formed through the motor mounting bracket; and
a plurality of coupling holes formed at a coupling member of the stator such that the plurality of coupling holes corresponds to the plurality of inner coupling holes, respectively, wherein the stator is mounted to the motor mounting bracket by a plurality of bolts fastened through the plurality of inner coupling holes and the plurality of coupling holes, in this order.

21. The driving apparatus according to claim 20, wherein the auxiliary bracket includes a plurality of bolt coupling bosses respectively corresponding to the plurality of inner coupling holes of the motor mounting bracket and the plurality of coupling holes of the stator.

22. The driving apparatus according to claim 17, wherein the molded member of the stator includes a reinforcing member that increases a strength of the molded member.

23. The driving apparatus according to claim 22, wherein the reinforcing member comprises a plurality of reinforcing ribs formed at an outer surface of the molded member such that the plurality of reinforcing ribs is integral with the molded member.

24. A driving apparatus for a washing machine, comprising:
a tub configured to contain washing water, and receive a drum such that the drum is rotatable therein, the tub including a plurality of bracket mounting bosses and a plurality of stator mounting bosses formed at a rear wall of the tub;
a dual rotor that includes an outer rotor including a plurality of magnets supported by an inner peripheral surface of the outer rotor, and an inner rotor arranged inside the outer rotor, the inner rotor including a plurality of magnets supported by an outer peripheral surface of the inner rotor;
a bearing housing formed at the rear wall of the tub such that the bearing housing is integral with the tub, the bearing housing rotatably supporting a drum shaft that connects the drum and the dual rotor;
a motor mounting bracket mounted to the rear wall of the tub that includes a plurality of outer coupling holes respectively corresponding to the plurality of bracket mounting bosses such that a plurality of bolts is fastened through the plurality of outer coupling holes and the corresponding plurality of bracket mounting bosses, and a plurality of inner coupling holes respectively corresponding to the plurality of stator mounting bosses such that the plurality of bolts is fastened through the plurality of inner coupling holes and the plurality of stator mounting bosses;
a stator that includes a core arranged such that opposite surfaces of the core face the plurality of magnets of the outer rotor and the plurality of magnets of the inner rotor, respectively, an insulator made of an insulating material, the insulator enclosing the core, a plurality of coils wound around the insulator, a molded member that encloses the insulator and the plurality of coils such that the molded member is integral with the insulator and the plurality of coils while allowing the opposite surfaces of the core to be exposed, and a coupling member that extends from the molded member, the coupling member being mounted to the rear wall of the tub via the motor mounting bracket; and
an auxiliary bracket interposed between the stator and the motor mounting bracket.

25. The driving apparatus according to claim 24, wherein the auxiliary bracket is interposed between the coupling member of the stator and the motor mounting bracket, and wherein the auxiliary bracket includes a plurality of bolt coupling bosses respectively corresponding to the plurality of inner coupling holes of the motor mounting bracket and the plurality of coupling holes of the stator.

26. A driving apparatus for a washing machine, comprising:
a tub configured to contain washing water, and receive a drum such that the drum is rotatable therein, the tub including a plurality of bracket mounting bosses formed at a rear wall of the tub;
a dual rotor that includes an outer rotor including a plurality of magnets supported by an inner peripheral surface of the outer rotor, and an inner rotor arranged inside the outer rotor, the inner rotor including a plurality of magnets supported by an outer peripheral surface of the inner rotor;
a bearing housing formed at the rear wall of the tub such that the bearing housing is integral with the tub, the bearing housing rotatably supporting a drum shaft that connects the drum and the dual rotor;
a motor mounting bracket mounted to the rear wall of the tub that includes a plurality of outer coupling holes respectively corresponding to the plurality of bracket mounting bosses such that a plurality of bolts is fastened through the plurality of outer coupling holes and the corresponding plurality of bracket mounting bosses, and a plurality of inner coupling holes is arranged inside the plurality of outer coupling holes;
a stator that includes a core arranged such that opposite surfaces of the core face the plurality of magnets of the outer rotor and the plurality of magnets of the inner rotor, respectively, an insulator made of an insulating material, the insulator enclosing the core, a plurality of coils wound around the insulator, a molded member that encloses the insulator and the plurality of coils such that the molded member is integral with the insulator and the plurality of coils while allowing the opposite surfaces of the core to be exposed, and a coupling member that extends from the molded member, the coupling member being mounted to the motor mounting bracket; and
an auxiliary bracket interposed between the stator and the motor mounting bracket.

27. The driving apparatus according to claim 26, wherein the auxiliary bracket is interposed between the coupling member of the stator and the motor mounting bracket, and wherein the auxiliary bracket includes a plurality of bolt coupling bosses respectively corresponding to the plurality of inner coupling holes of the motor mounting bracket and the plurality of coupling holes of the stator.

28. A driving apparatus for a washing machine, comprising:
a tub configured to contain washing water, and receive a drum such that the drum is rotatable therein, the tub including a plurality of bracket mounting bosses formed at a rear wall of the tub;
a dual rotor that includes an outer rotor including a plurality of magnets supported by an inner peripheral surface of the outer rotor, and an inner rotor arranged inside the outer rotor, the inner rotor including a plurality of magnets supported by an outer peripheral surface of the inner rotor;
a bearing housing formed at the rear wall of the tub such that the bearing housing is integral with the rub, the bearing housing rotatably supporting a drum shaft that connects the drum and the dual rotor;
a motor mounting bracket mounted to the rear wall of the tub that includes a plurality of outer coupling holes respectively corresponding to the plurality of bracket mounting bosses such that a plurality of bolts is fastened through the plurality of outer coupling holes and the corresponding plurality of bracket mounting bosses, and a plurality of inner coupling holes arranged inside the plurality of outer coupling holes;

a stator that includes a core arranged such that opposite surfaces of the core face the plurality of magnets of the outer rotor and the plurality of magnets of the inner rotor, respectively, an insulator enclosing the core, a plurality of coils wound around the insulator, and a coupling member that extends from the insulator, the coupling member being mounted to the rear wall of the tub via the motor mounting bracket; and an auxiliary bracket interposed between the stator and the motor mounting bracket.

29. The driving apparatus according to claim 28, wherein the auxiliary bracket is interposed between the coupling member of the stator and the motor mounting bracket, and wherein the auxiliary bracket includes a plurality of bolt coupling bosses respectively corresponding to the plurality of inner coupling holes of the motor mounting bracket and the plurality of coupling holes of the stator.

30. A driving apparatus for a washing machine, comprising:

a tub configured to contain washing water, and receive a drum such that the drum is rotatable therein, the tub including a plurality of bracket mounting bosses formed at a rear wall of the tub;

a dual rotor that includes an outer rotor including a plurality of magnets supported by an inner peripheral surface of the outer rotor, and an inner rotor arranged inside the outer rotor, the inner rotor including a plurality of magnets supported by an outer peripheral surface of the inner rotor;

a bearing housing formed at the rear wall of the tub such that the bearing housing is integral with the tub, the bearing housing rotatably supporting a drum shaft that connects the drum and the dual rotor;

a motor mounting bracket mounted to the rear wall of the tub, that includes a plurality of outer coupling holes respectively corresponding to the plurality of bracket mounting bosses such that a plurality of bolts is fastened through the plurality of outer coupling holes and the corresponding plurality of bracket mounting bosses, and a plurality of inner coupling holes arranged inside the plurality of outer coupling holes;

a stator that includes a core arranged such that opposite surfaces of the core face the plurality of magnets of the outer rotor and the plurality of magnets of the inner rotor, respectively, an insulator enclosing the core, a plurality of coils wound around the insulator, and a coupling member that extends from the insulator, the coupling member being mounted to the motor mounting bracket; and an auxiliary bracket interposed between the stator and the motor mounting bracket.

31. The driving apparatus according to claim 30, wherein the auxiliary bracket is interposed between the coupling member of the stator and the motor mounting bracket, and wherein the auxiliary bracket includes a plurality of bolt coupling bosses respectively corresponding to the plurality of inner coupling holes of the motor mounting bracket and the plurality of coupling holes of the stator.

* * * * *